United States Patent

Hiltmann et al.

[11] 3,894,039
[45] July 8, 1975

[54] 1-HALOPHENYL-2-IMINO-IMIDAZOLIDINES

[75] Inventors: Rudolf Hiltmann; Hartmund Wollweber, both of Wuppertal-Elberfeld; Günther Hermann, Opladen, all of Germany

[73] Assignee: Bayer Aktiengesellschaft, Leverkusen, Germany

[22] Filed: Aug. 7, 1972

[21] Appl. No.: 278,699

[30] Foreign Application Priority Data

Aug. 12, 1971  Germany............................ 2140405

[52] U.S. Cl. ............ 260/309.7; 260/309.6; 424/84
[51] Int. Cl. ...................... C07d 49/30; C07d 49/34
[58] Field of Search...................... 260/309.6, 309.7

[56] References Cited
UNITED STATES PATENTS

| | | | |
|---|---|---|---|
| 3,027,370 | 3/1962 | Bindler et al. .................. | 260/309.7 |
| 3,121,645 | 2/1964 | Bindler et al. .................. | 260/309.7 |
| 3,274,230 | 9/1966 | Braun .............................. | 260/309.7 |
| 3,712,905 | 1/1973 | Dietrich et al. ................. | 260/309.7 |

FOREIGN PATENTS OR APPLICATIONS

| | | | |
|---|---|---|---|
| 972,003 | 10/1964 | United Kingdom.............. | 260/309.7 |
| 765,547 | 1/1957 | United Kingdom.............. | 260/309.7 |

OTHER PUBLICATIONS

Wanzlick et al., Chem. Abst., Vol. 63, columns 16333–16334 (1965), QD1.A51.

Wollweber et al., Chem. Abst., Vol. 61, columns 651–652 (1964), QD1.A51.

*Primary Examiner*—Natalie Trousof
*Attorney, Agent. or Firm*—Burgess, Dinklage & Sprung

[57] ABSTRACT

1-halophenyl-2-imino-imidazolidines of the formula

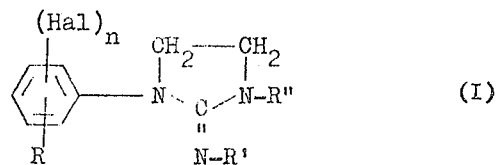

in which
  Hal is halogen,
  R is hydrogen, halogen, lower alkyl, lower alkoxy or halo-lower alkyl,
  R' and R" each independently is hydrogen or alkyl of one to six carbon atoms, and
  $n$ is 1, 2, 3 or 4, and their salts,
which possess bird repellent properties.

10 Claims, No Drawings

1-HALOPHENYL-2-IMINO-IMIDAZOLIDINES

The present invention relates to and has for its objects the provision of particular new 1-halophenyl-2-imino-imidazolidines which possess bird repellent properties, active compositions in the form of mixtures of such compounds with solid and liquid dispersible carrier vehicles, and methods for producing such compounds and for using such compounds in a new way especially for repelling birds, with other and further objects becoming apparent from a study of the within specification and accompanying examples.

It is known that anthraquinone can be used for repelling birds; the action is however unsatisfactory in many respects. The present invention provides, as new compounds, the 1-phenyl-2-imino-imidazolidines of the formula

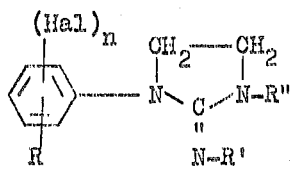

in which

Hal is halogen,
R is hydrogen, halogen, lower alkyl, lower alkoxy or halo-lower alkyl,
R' and R'' each independently is hydrogen or alkyl of one to six carbon atoms, and
n is 1, 2, 3 or 4,
and their salts.

Surprisingly, the repellent action of the active compounds according to the invention is greater than that of the known bird-repellent anthraquinone. The compounds therefore represent an enrichment of the art.

Preferably, in formula (I), Hal is chlorine or bromine; R is hydrogen, chlorine, or alkyl, alkoxy or haloalkyl of one to four carbon atoms, especially methyl, ethyl, methoxy or trifluoromethyl; R' is hydrogen or lower alkyl of to four carbon atoms,; and R'' is hydrogen or alkyl of one or four carbon atoms.

The present invention also provides a process for the preparation of a 1-phenyl-2-imino-imidazolidine of the formula (I) in which (a) a phenyl-ethylenediamine of the formula

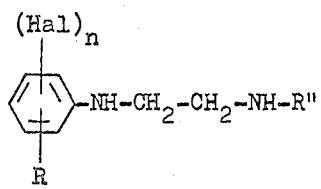

in which

Hal, R, R'' and n have the above-mentioned meanings, is reacted with a cyanogen halide, the imidazolidine base being liberated, if required, from the resultant salt, or (b) a cyclic isothiuronium salt of the formula

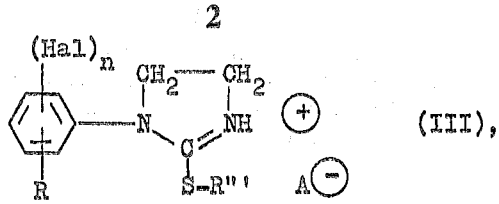

in which

Hal, R and n have the above-mentioned meanings,
R''' is lower alkyl, and A⊖ is the anion of an acid,
is reacted with a compound of the formula

in which

R' has the above-mentioned meaning, or (c) an N-(phenylaminoethyl)-thiourea of the formula

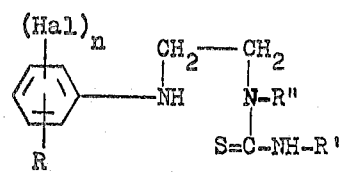

in which

Hal, R, R', R'' and n have the meanings given above, is cyclized with a heavy metal oxide or heavy metal salt, or (d) an isothiuronium salt of the formula

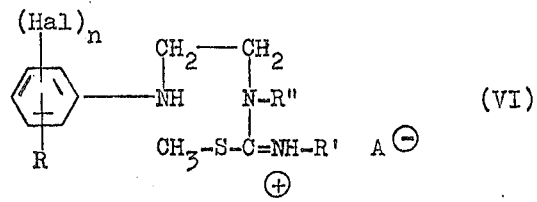

in which

Hal, R R', R'', A⊖ and n have the above-mentioned meanings,
is heated to a temperature above 50°C for a prolonged period.

If, according to process variant (a), N-(3,4-dichlorophenyl)-N'-ethyl-ethylenediamine and cyanogen bromide are used as the starting materials, the course of the reaction can be represented by the following equation:

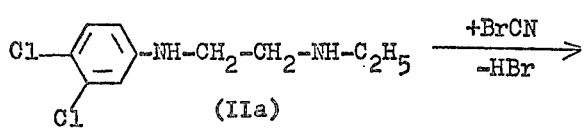

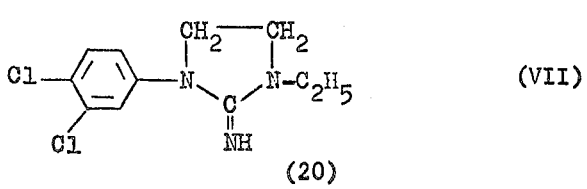

If, according to process variant (b), 1-(3',4'-dichlorophenyl)-2-methylthio-imidazolidinium iodide and ethylamine are used as the starting materials, the course of the reaction can be represented by the following equation:

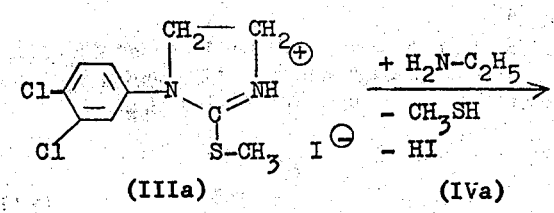

(IIIa)   (IVa)

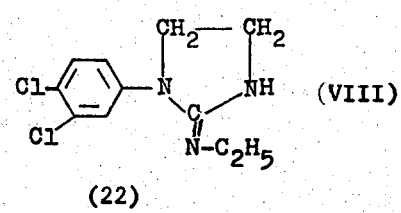

(22)

If, according to process variant (c), N-(β-(3,4-dichlorophenylamino)-ethyl)-N,N'-dimethyl-thiourea and mercury oxide are used as the starting materials, the course of the reaction can be represented by the following equation:

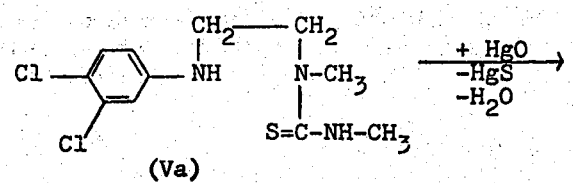

(Va)

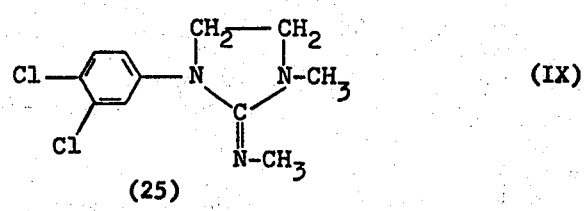

(25)

Finally, if according to process variant (d) the isothiuronium salt obtained from N-(3,4-dichlorophenyl)-N'-ethyl-ethylenediamine, ethyl isothiocyanate and methyl iodide is used as the starting material and is heated, the reaction represented by the following equation takes place:

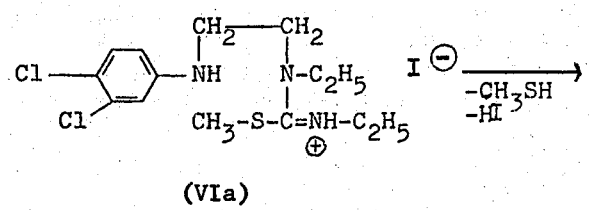

(VIa)

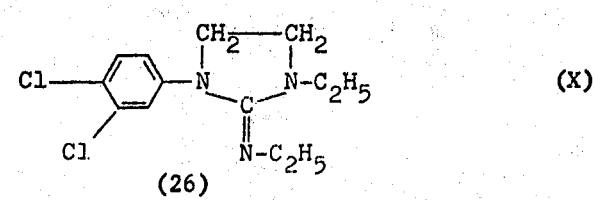

(26)

The process variant (a) is advantageously used for the preparation of those compounds of the general formula (I) in which R' is hydrogen and R'' is alkyl; for those compounds in which R' is alkyl and R'' is hydrogen or alkyl, process variant (b) is suitable, whereas process variants (c) and (d) are preferably used where R' and R'' are both alkyl.

A number of the phenyl-ethylenediamines of the formula (II) have been described in the literature. The compounds that are unsubstituted at the N'-atom can be prepared in a manner which is in itself known if, in a first stage, an appropriately substituted aniline is reacted with paraformaldehyde and potassium cyanide to give the corresponding phenylaminoacetonitrile and, in a second stage, this nitrile is catalytically hydrogenated to the phenyl-ethylenediamine derivative.

Phenyl-ethylenediamines alkylated at the N'-atom can be prepared, for example, by N-alkylation of substituted anilines by means of reactive esters of N-alkyl-aminoethanols, such as, for example, the hydrogen halide esters or arylsulfonic acid esters, optionally in the presence of alkaline condensation agents, such as, for example, an alkali metal carbonate, alkali metal hydroxide or sodium amide.

Cyanogen chloride and cyanogen bromide are the preferred cyanogen halides required as starting materials for the process variant (a). The compounds are generally known.

The cyclic isothiuronium salts required as starting materials for the process variant (b) are generally defined by the formula (III); in this formula, $A^{\ominus}$ is preferably a chloride, bromide or iodide anion. The isothiuronium salts of the formula (III) are obtained if carbon disulfide is added to phenyl-ethylenediamines of the formula (II) in alcohols or ethers as solvents, at 20° to 50°C, and the resulting dithiocarbamic acids are converted, with elimination of hydrogen sulfide, into cyclic thioureas which then yield the desired isothiuronium salts of the formula (III) by addition, preferably of an alkyl halide.

The other compounds (ammonia or primary amines) required as starting materials for the process variant (b) are defined by the general formula (IV). In this formula, R' preferably represents hydrogen, methyl, ethyl, propyl or butyl. The compounds of the formula (IV) are generally known.

A compound of the formula (V) is obtained if an isothiocyanate is added onto the appropriate N-phenylethylenediamine derivative. A compound (VI) is obtained by addition, preferably of an alkyl halide, to the appropriate compound of the formula (V).

Suitable diluents for the reaction according to process variant (a) are alcohols, such as methanol, ethanol and isopropanol, and ethers, such as diethyl ether, dioxane and tetrahydrofuran. For the reaction according to process variant (b) (aminolysis) it is possible to use customary solvents, such as chlorinated hydrocarbons, alcohols and water; the amine (IV) to be reacted can also be employed in an excess.

Reaction temperatures can be varied over a fairly wide range. In general they are about 30° to 120°C, preferably about 50° to 100°C, for process variant (a) and about 50° to 150°C, preferably about 80° to 120°C, for process variant (b).

To carry out the reaction according to process variant (a), the reactants are generally brought together in equimolar ratios in a diluent and are heated to the desired reaction temperatures; however, it is advantageously possible to employ the cyanogen halide in an excess of about 10 to 50 mole per cent. The reaction mixture is worked up in the usual manner, for example by evaporation in vacuo and recrystallization of the residue. According to this process, the imidazolidines (I) are obtained in the form of their hydrogen halide salts, such as the hydrogen chloride salts or hydrogen bromide salts. The pure bases can be obtained from these in accordance with customary processes, for example by reaction with alkali metal hydroxide solutions.

To carry out the reaction according to process variant (b), the above-mentioned solvents are generally used. Working up is carried out in the usual manner, for example by evaporating off the solution, taking up the residue in dilute acid, precipitating the base with alkali, taking it up in ether and driving off the solvent. When using phenol as the solvent, the latter must first be removed by suitable measures such as, for example, by taking up in strong alkali hydroxide solution. The crude bases obtained may be purified by recrystallization.

An appropriate procedure for carrying out process variant (c) is to react a phenyl-ethylenediamine derivative with an aliphatic isothiocyanate in an inert solvent, for example in a halogenated hydrocarbon such as methylene chloride or chloroform, or in an ether such as tetrahydrofuran or dioxane, the reaction taking place slightly exothermically and appropriately being completed by brief heating (preferably up to the boiling point of the solvent used). The thiourea of the formula (V) contained in the solution is not isolated. The cyclization is preferably effected with mercury oxide which immediately after completion of the formation of thiourea is progressively introduced into the hot reaction solution, while stirring. After completion of the addition, the mixture is stirred for about a further hour while warming to 70°–75°C; after cooling, the mercury sulfide that has separated out is filtered off. The resulting solution is evaporated and the crude product is purified by vacuum distillation.

The thiourea also does not have to be isolated for the cyclization process according to (d), which occurs via an isothiuronium salt. Appropriately, after completion of the formation of thiourea, the reactive ester, preferably methyl iodide, is addded to the reaction mixture while it is still hot and heating is continued until the evolution of methyl mercaptan is complete. Here again, an isolation of the isothiuronium salt (VI) which occurs as an intermediate is not necessary. Working up takes place in the customary manner already described in detail above.

The 1-phenyl-2-imino-imidazolidines obtained in the form of the bases can be converted into corresponding salts by reaction with acids. Sparingly soluble salts can be obtained from easily soluble salts by precipitation with suitable salts.

All acids can be used as the salt-forming acids, although for many purposes, salts with non-toxic acids will be preferred. Thus it is possible to use inorganic acids, such as hydrochloric, sulfuric, phosphoric, nitric, perchloric and ferrocyanic acids. In the same way, it is also possible to use organic acids, such as acetic, benzoic, tartaric, citric, picric, salicyclic, methylsulfuric, methanesulfonic and benzenesulfonic acids.

The active compounds according to the invention, while of low toxicity to warm-blooded animals, possess a repellent action against harmful birds, such as anserine birds (Anseriformes), gallinaceous birds (Galliformes), charadriiform birds (Charadriiformes), cuculine birds (Cuculiformes) and passerine birds (Passeriformes). The said action is not only manifested by the free imidazolidines but also by all their salts. In these salts, the anion is immaterial to the action.

The anserine birds essentially comprise geese (Anseridae), such as ducks (Anatinae). The gallinaceous birds in particular include the true fowls (Gallidae), such as the ringnecked pheasant (*Phasianus colchicus*). Particularly important charadriiform birds are the pigeons (Columbae), such as the wood pigeon (*Columba palumbus*) *and the rock dove* (*Columba livia*) and its domestic varieties. Amongst the cuculine birds, the cuckoos (Cuculi), such as, for example, the plantain eaters (Musophagidae), play a special role, as do the parrots (Psittaci), for example the parakeets (Psittacinae). The passerine birds essentially include the ravens (Corvidae), such as the carrion crow (*Corvus corone*) and the rock (*Corvus frugilegus*), the starlings (Sturnidae), the American blackbirds (Icteridae), the finches (Fringillidae), such as the sparrows (*Passer spec.*), and the weaverbirds (*Ploceidae*), such as the red-billed weaver (*Quelea quelea*).

The active compounds according to the instant invention can be utilized, if desired, in the form of the usual formulations or compositions with conventional inert (i.e., plant compatible or herbicidally inert) repellent diluents or extenders, i.e., diluents, carriers or extenders of the type usable in conventional repellent formulations or compositions, e.g. conventional repellent dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional repellent dispersible liquid diluent carriers and/or dispersible solid carriers optionally with the use of carrier vehicle assistants, e.g. conventional repellent surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and-/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other repellents, or insecticides, acaricides rodenticides, fungicides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.001–30%, preferably 0.1–15%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.001–95%, and preferably 0.01–95%, by weight of the mixture.

The active compounds can also be used in accordance with the well known ultra-low-volume process with good success, i.e., by applying such compound if normally a liquid, or by applying a liquid composition containing the same, via very effective atomizing equipment, in finely divided form, e.g. average particle diameter of from 50–100 microns, or even less, i.e., mist form, for example by airplane crop spraying techniques. Only up to at most about a few liters/hectare are needed, and often amounts only up to about 15 to 1,000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

The use of the active compounds according to the invention, their formulations and the application forms manufactured therefrom may be effected in the customary manner, for example by the dressing of seed, by the spraying, dusting or scattering of suitable preparations of active compounds onto plants, or parts of plants, that are in danger of being eaten by birds, by soil treatment, by fumigation, by the application of repellent coatings and barriers, and by the impregnation of materials endangered by birds, such as wood, paper, rubber and plastics.

For the dressing of seed, 0.01 to 5 g of active compound, preferably 0.025 to 1 g, are generally used per 100 g of seed.

Spraying liquors for producing bird-repellent coverings, for example on endangered plants or parts of plants, in general contain 0.1 to 20, preferably 0.5 to 10, per cent by weight of active compound. Materials that are impregnated with the active compounds should generally have an active compound concentration of 0.1 to 5 per cent by weight in the surface layers.

The activity of the compounds according to the invention is shown by the following test Example; the numbers assigned to the formulas are correlated with the corresponding preparative Example numbers hereinafter, primed numbers indicating salt-forms.

EXAMPLE 1

Repellent test/Domestic pigeon (*Columba livia*)

In order to prepare an appropriate preparation of active compound, 3 parts by weight of active compound are mixed with 2.8 parts by weight of highly dispersed silica and 4.3 parts by weight of talc. 6 parts by weight of this active compound concentrate, with the addition of 11 parts by weight of polyethylene glycol as an adhesive, are intimately mixed with 1,000 parts by weight of seed wheat and the mixture is shaken until the seed has been uniformly impregnated. The active compound content is then 0.18%.

120 g of the wheat impregnated in this way are filled into a transparent plastic container provided with a circular opening on the front wall. This container is placed before 2 feral pigeons kept together. No untreated feed is available to the animals, while they receive as much water as desired. The experiment is carried out for 60 hours under continuous illumination.

The residual amount of treated seed, weighed at the end of the experiment, in per cent of the amount employed, serves as a measure of the repellent action. 100% thus denotes that no wheat has been eaten and the repellent action was thus complete.

The active compounds, repellent action and number of individual experiments are shown in the table which follows:

Table 1

Repellent test/domestic pigeon

| Active compound | Number of individual experiments | Repellent action in % (average value) |
|---|---|---|
| Anthraquinone | 2 | 30 |

Table 1 (continued)
Repellent test/domestic pigeon
| Active compound | Number of individual experiments | Repellent action in % (average value) |
|---|---|---|
| 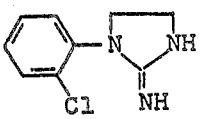 (2) | 1 | 80.0 |
| 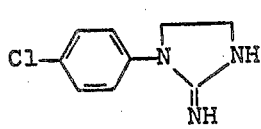 (4) | 2 | 81.3 |
| 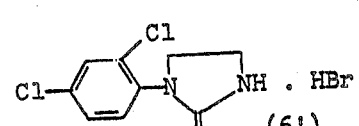 (6') | 1 | 77.5 |
| 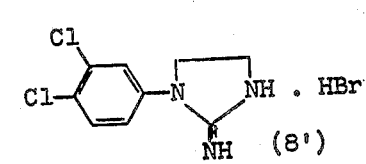 (8') | 4 | 88.3 |
| 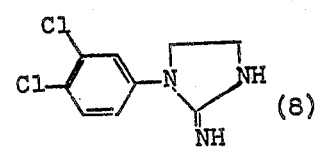 (8) | 3 | 91.9 |
| 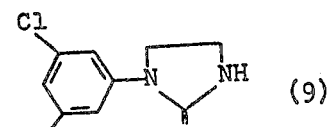 (9) | 4 | 90.4 |
| 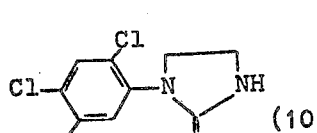 (10) | 3 | 85.5 |
| 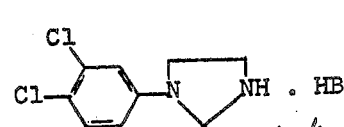 (11') | 4 | 88.9 |
| 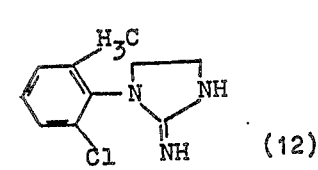 (12) | 1 | 72.4 |

Table 1 (continued)
Repellent test/domestic pigeon
| Active compound | Number of individual experiments | Repellent action in % (average value) |
|---|---|---|
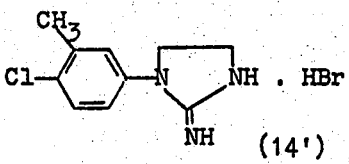

Table 1 (continued)

Repellent test/domestic pigeon

| Active compound | Number of individual experiments | Repellent action in % (average value) |
|---|---|---|
| 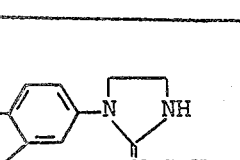 (24) | 4 | 88.1 |
| 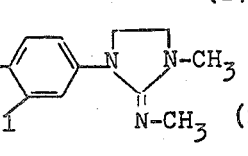 (25) | 2 | 94.2 |
| 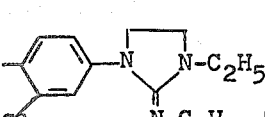 (26) | 4 | 92.0 |
| 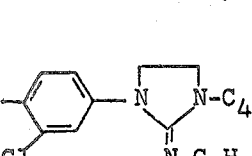 (27) | 2 | 94.2 |

The process of this invention is illustrated in and by the following preparative Examples.

EXAMPLE 2

*a.* A solution of 69.5 g of potassium cyanide in 150 ml of water is added dropwise, with stirring, to a mixture of 148.4 g of 4,5-dichloro-2-aminotoluene, 27.4 g of paraformaldehyde and 2,000 ml of glacial acetic acid, and the mixture is subsequently heated to 50°C for 60 hours. After evaporating off the solvent in vacuo, the residue is taken up in ether and water and the ether solution is separated off and washed with potassium carbonate solution and water. After drying with potassium carbonate, the ether is distilled off and the residue is recrystallized from a benzene/ligroin mixture. 114 g of N-(4,5-dichloro-2-methylphenyl)-aminoacetonitrile of the melting point 97° to 99°C are obtained and are dissolved in 350 ml of anhydrous benzene and hydrogenated, after addition of 50 ml of liquid ammonia and 10 g of anhydrous and alcohol-free Raney cobalt, at 110°C under a pressure of 70 atmospheres until the absorption of hydrogen has ceased. After cooling, the catalyst is separated off, the mixture is evaporated in vacuo and the residue is distilled under reduced pressure. 94.5 g of N-(4,5-dichloro-2-methylphenyl)-ethylenediamine of boiling point 149° to 150°C/0.2 mm Hg are obtained as a yellowish oil which crystallizes after brief standing (melting point 44° to 47°C).

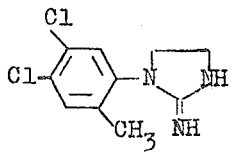 (1)

A solution of 18.3 g (0.173 mole) of cyanogen bromide in 75 ml of alcohol is added dropwise at 20° to 30°C to a solution of 32.8 g (0.15 mole) of N-(4,5-dichloro-2-methylphenyl)-ethylenediamine in 150 ml of alcohol. Thereafter the mixture is boiled for half an hour and evaporated; the residue is recrystallized from a methanol-ether mixture. 39.5 g of 1-(4',5'-dichloro-2'-methylphenyl)-2-imino-imidazolidine hydrobromide of the melting point 221° to 222°C are obtained. After recrystallization from an ethyl acetate/ligroin mixture the base melts at 178° to 179°C. The yield is 81% of theory.

The following compounds of the formula

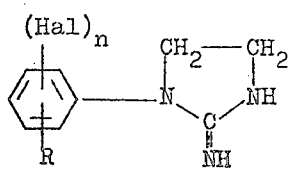

can be obtained in accordance with procedures analogous to that described in Example 2:

| Compound No. | (Hal)ₙ | R | Melting points in °C free base | HBr salt |
|---|---|---|---|---|
| 2 | 2-Cl | H | 127–129 | 219–221 |
| 3 | 3-Cl | H | 55–57 | 166–168 |
| 4 | 4-Cl | H | 150–151 | 214 |
| 5 | 2,3-Cl₂ | H | 139–141 | 248–251 |
| 6 | 2,4-Cl₂ | H | — | 171–174 |
| 7 | 2,5-Cl₂ | H | — | 194–195.5 |
| 8 | 3,4-Cl₂ | H | 80–81 120.5–121.5* | 201–202.5 |
| 9 | 3,5-Cl₂ | H | 100–102 | 258–260 |
| 10 | 2,4,5-Cl₃ | H | 153–155 | 205–207 |
| 11 | 3,4,5-Cl₃ | H | — | 280–282 |
| 12 | 2-Cl | 6-CH₃ | 183–184 | 278–280 |
| 13 | 3-Cl | 4-CH₃ | 135–136 | 231–233 |
| 14 | 4-Cl | 3-CH₃ | — | 175–177 |
| 15 | 2-Cl | 5-CF₃ | 120–122 | 203–206 |
| 16 | 4-Cl | 2-CF₃ | 139–140 | 263–264 |
| 17 | 2,4-Cl₂ | 5-CH₃ | 136–137 | 240–242 |
| 18 | 4,5-Cl₂ | 2-CH₃O | 154–156.5 | 226–227 |

*Two melting point modifications

Furthermore, the following compounds of the general formula

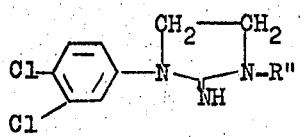

can be prepared analogously to the preceding examples:

| Compound No. | R'' | Melting point in °C (free base) |
|---|---|---|
| 19 | CH₃ | 102–104 |
| 20 | C₂H₅ | 103–104 |
| 21 | n-C₄H₉ | 53–57 |

EXAMPLE 3 a. A solution of 205 g of 3,4-dichlorophenyl-ethylenediamine in 200 ml of ethyl alcohol is added dropwise over the course of 1.5 hours to a solution of 252 g of carbon disulfide in 300 ml of ethyl alcohol at 16° to 25°C while stirring, and the mixture is stirred for a further 1.5 hours at 50°C. Thereafter the excess carbon disulfide and the solvent are distilled off in vacuo. The residue is taken up in 500 ml of water. After adding 3 ml of concentrated hydrochloric acid, the mixture is boiled for 2.5 hours under a reflux condenser and is allowed to cool; the material which has separated out is filtered off and the filter residue is washed with methanol. After drying, 135 g of 1-(3',4'-dichlorophenyl)-imidazolidine-2-thione of the melting point 166° to 167°C are obtained. A solution of 124 g of the latter material and 142 g of methyl iodide in 650 ml of ethyl alcohol is stirred for half an hour at 50° to 60°C and subsequently heated for 1.5 hours under a reflux condenser. After cooling, the material that has separated out is filtered off and rinsed with ethyl alcohol. After drying, 187 g of 1-(3',4'-dichlorophenyl)-2-methylmercapto-2-imidazolinium iodide are obtained in the form of colorless crystals of the melting point 203° to 204°C.

b)

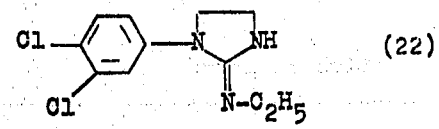

50 ml of a 50% strength aqueous ethylamine solution are added to a solution of 30 g (0.77 mole) of 1-(3',4'-dichlorophenyl)-2-methylmercapto-2-imidazolinium iodide in 100 ml of ethyl alcohol and the mixture is boiled for 20 hours under a reflux condenser, in the course of which methylmercaptan is evolved. After cooling, the solution is evaporated in vacuo, the residue is dissolved in dilute hydrochloric acid and the solution in hydrochloric acid is extracted with ether. Thereafter the base is precipitated with sodium hydroxide solution and taken up in methylene chloride; the methylene chloride solution is dried with potassium carbonate. After driving off the solvent, the residue is distilled in vacuo, whereupon 10.1 g of 1-(3',4'-dichlorophenyl)-2-ethylimino-imidazolidine are obtained as a yellowish oil of the boiling point 162° to 166°C/0.2 mm Hg; melting point 85°C (from methanol/water). The yield is 51% of theory.

The following compounds of the general formula

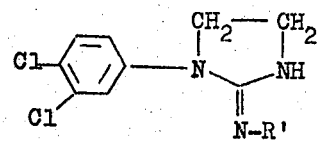

can be obtained analogously to the preceding example:

| Compound No. | R' | Physical properties (free base) |
|---|---|---|
| 23 | CH₃ | Melting point 114°C |
| 24 | n-C₄H₉ | Boiling point 172–175°C/0.1 mm Hg |

EXAMPLE 4

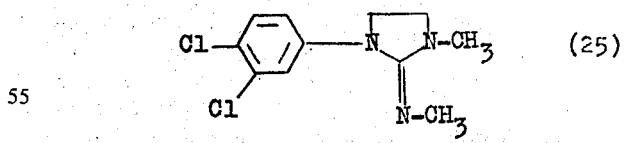

8.1 g (0.11 mole) of methyl isothiocyanate are added dropwise to a solution of 21.9 g (0.1 mole) of N-(3,4-dichlorophenyl)-N'-methylethylenediamine in 600 ml of ethyl alcohol and the mixture is subsequently warmed to 70°C for 15 minutes. Thereafter a total of 140 g (0.65 mole) of mercury oxide are gradually added while stirring and continuing to warm to 70° – 75°C, and after completion of the addition the mixture is kept for 1 hour at 70° – 75°C. After cooling, the mixture is filtered, the solution is evaporated and the residue is distilled in vacuo. 21.1 g of 1-(3',4'-dichlorophenyl)-2-methylimino-3-methylimidazolidine are obtained as a colorless oil of the boiling point 143°C/0.05 mm Hg. The yield is 82% of theory.

EXAMPLE 5

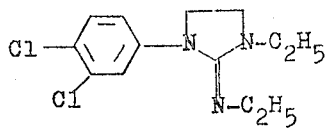

9.6 g (0.11 mole) of ethyl isothiocyanate are added dropwise to a solution of 23.3 g (0.1 mole) of N-(3,4-dichlorophenyl)-N'-ethyl-ethylenediamine in 150 ml of dry tetrahydrofuran and the mixture is subsequently heated for 15 minutes under a reflux condenser. Thereafter the solution is evaporated in vacuo and the residue is dissolved in 150 ml of ethyl alcohol. After adding 15.6 g (0.11 mole) of methyl iodide, the whole is heated for 5 hours under a reflux condenser until the evolution of methylmercaptan has ceased. After evaporation of the solution, the residue is taken up in ether and the solution is extracted with dilute hydrochloric acid. The base is precipitated from hydrochloric acid solution by means of a sodium hydroxide solution and is taken up in ether. After driving off the solvent, the residue is distilled in vacuo and 18.2 g of 1-(3',4'-dichlorophenyl)-2-ethylimino-3-ethylimidazolidine are obtained as a yellowish oil of boiling point 150°–160°C/0.3 mm Hg. The yield is 64% of theory.

EXAMPLE 6

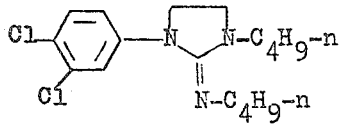

The compound is obtained analogously to Example 5. Boiling point 166°–170°C/0.07 mm Hg.

It will be appreciated that the instant specification and examples are set forth by way of illustration and not limitation and that various modifications and changes may be made without departing from the spirit and scope of the present invention.

What we claim is:

1. A 1-phenyl-2-imino-imidazolidine of the formula:

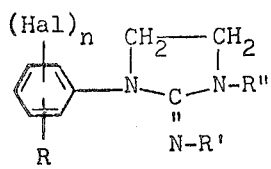

in which
Hal is halogen,
R is hydrogen, halogen, lower alkyl, lower alkoxy or halo-lower alkyl,
R' and R'' each independently is hydrogen or alkyl of one to six carbon atoms, and
n is 1, 2, 3 or 4,
or a salt thereof.

2. Compound according to claim 1, in which Hal is chlorine or bromine; R is hydrogen, chlorine, methyl, ethyl, methoxy or trifluoromethyl; R' is hydrogen or lower alkyl; and R'' is hydrogen or lower alkyl.

3. The compound according to claim 1 wherein such compound is 1-(3',4'-dichlorophenyl)-2-imino-imidazolidine of the formula:

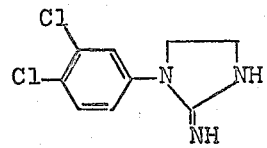

or a salt thereof.

4. The compound according to claim 1 wherein such compound is 1-(3',5'-dichlorophenyl)-2-imino-imidazolidine of the formula:

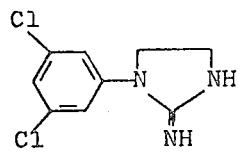

or a salt thereof.

5. The compound according to claim 1 wherein such compound is 1-(3',4'-dichlorophenyl)-2-imino-3-ethylimidazolidine of the formula:

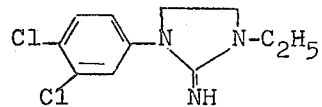

or a salt thereof.

6. The compound according to claim 1 wherein such compound is 1-(3',4'-dichlorophenyl)-2-methylimino-3-methylimidazolidine of the formula:

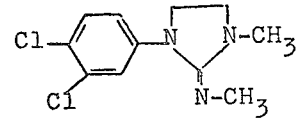

or a salt thereof.

7. The compound according to claim 1 wherein such compound is 1-(3',4'-dichlorophenyl)-2-ethylimino-3-ethylimidazolidine of the formula:

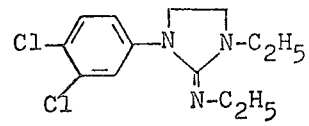

or a salt thereof.

8. The compound according to claim 1 wherein such compound is 1-(3',4'-dichlorophenyl)-2-butylimino-3-butylimidazolidine of the formula:

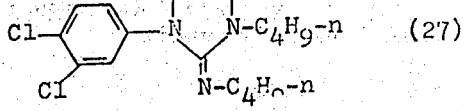

or a salt thereof.

9. A compound according to claim 1 in the form of a salt of hydrochloric, sulfuric, phosphoric, nitric, perchloric, ferrocyanic, acetic, benzoic, tartaric, citric, picric, salicyclic, methylsulfuric, methanesulfonic or benezenesulfonic acid.

10. A 1-phenyl-2-imino-imidazolidine of the formula

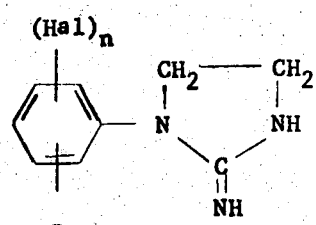

in which
  Hal is halogen,
  R is hydrogen, halo, lower alkyl or lower alkoxy and
  $n$ is 1 or 2
or a non-toxic salt thereof.

* * * * *